Dec. 23, 1941.    J. J. JAKOSKY    2,267,465
RECORDING ELECTRIC METER
Filed April 15, 1940
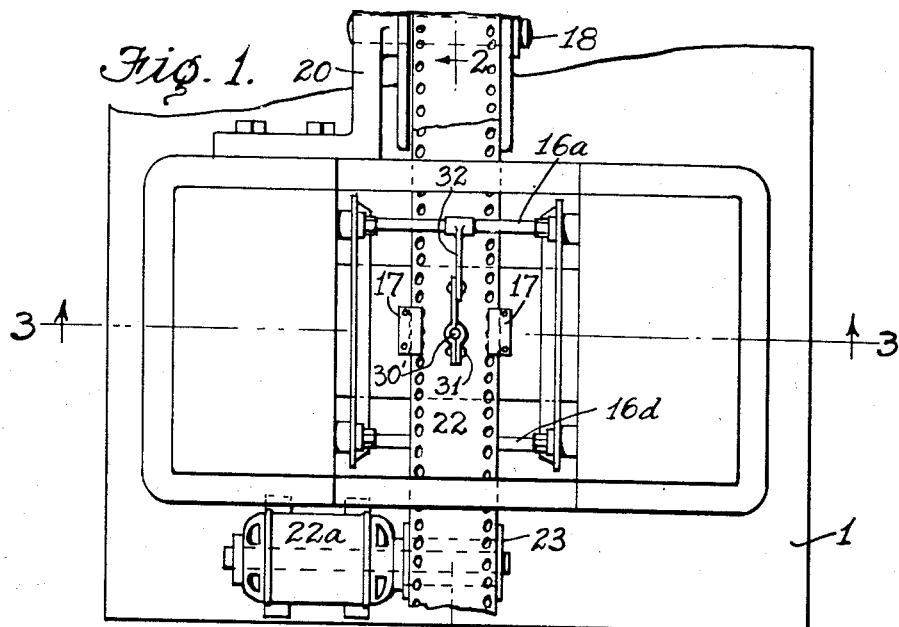
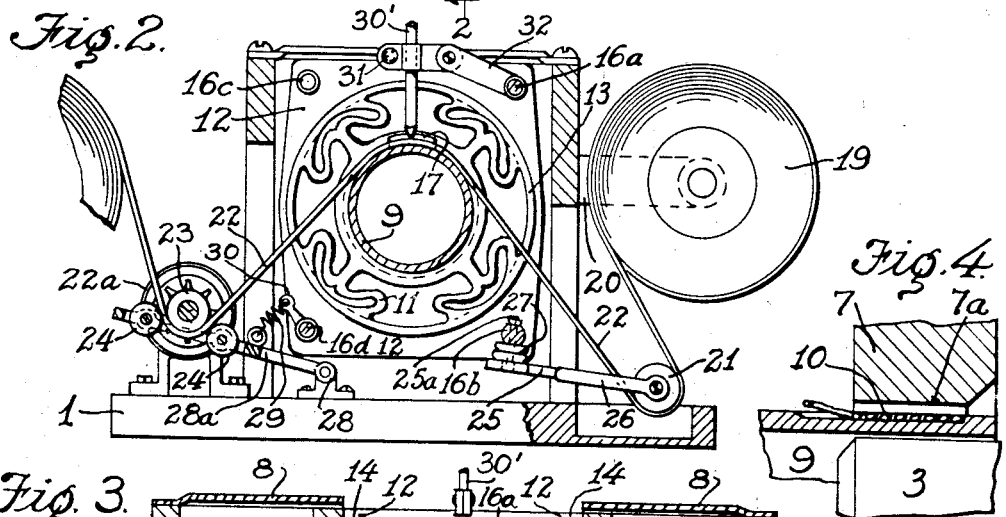
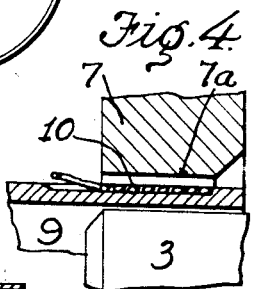
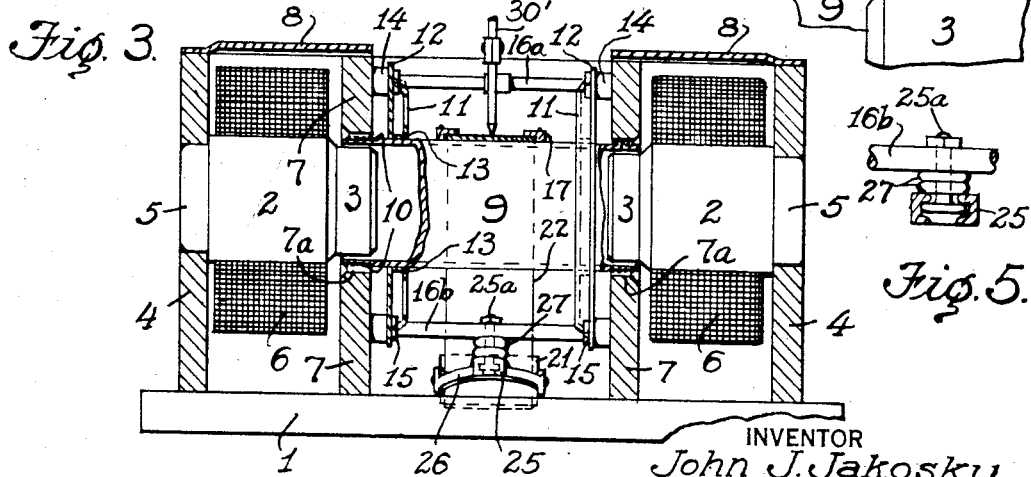
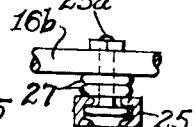
INVENTOR
John J. Jakosky
BY Philip Subkow
ATTORNEY.

Patented Dec. 23, 1941

2,267,465

UNITED STATES PATENT OFFICE 2,267,465

RECORDING ELECTRIC METER

John Jay Jakosky, Los Angeles, Calif.

Application April 15, 1940, Serial No. 329,687

2 Claims. (Cl. 234—5.5)

This invention relates to an electric meter of the recording type in which the variation of the characteristics of a current is recorded either as a function of time or as a function of some other variable. It is more particularly related to the type of electric meter in which the variations in the characteristics of an electrical current may be recorded upon a moving tape or other record receiving means. In the specific embodiment, hereinafter described, the marking means is a stylus which is held stationary and to the tape is imparted a component of motion, under the stylus, transverse of the tape, which component is responsive to the variation in the characteristics of the current and a component of motion parallel to the length of the tape, which is as a function of time.

It is an object of my invention to provide an electric meter of the recording type in which the record receiving means is a tape which is moved in relation to a stylus or marker under the influence of the current whose characteristics are recorded.

It is a further object of this invention to provide an electric meter of the recording type in which an armature is moved, responsive to the variations in the characteristics of the current whose characteristics is to be measured, and in which the record receiving means is connected to the armature in such manner that it follows the motion of the armature.

It is a further object of this invention to provide an electric meter in which the variations in the characteristics of a current are recorded on a moving tape passing under a marking means adapted to record the variations of said current, wherein the tape is moved in a direction along its length and under the influence of the current to be measured in a direction generally transverse its length.

It is a further object of my invention to provide a tape feeding and supporting means for record forming devices in which the tape is moved under a marking means in a direction transverse its length under the influence of a force to be recorded, wherein the tape feeding means includes tape holding and gripping means, one on each side of the tape supporting means and out of line therewith so that the tape forms a loop and the tape may be translated under the marker and moved longitudinally under the marker without deformation of the tape portion passing under the marker.

It is one of the objects of this invention to provide an electric meter wherein a record tape is moved under a marker or stylus at a uniform rate longitudinally of the record, under a regulatable and uniform tension and to flexibly support the tape to permit of translation of the tape transverse its length under a marker or stylus.

This invention and objects which will be attained thereby will be better understood by reference to the drawing, of which Fig. 1 is a plan view of the instrument, broken away for clearer illustration. Fig. 2 is a section taken on line 2—2 of Fig. 1. Fig. 3 is a broken away view taken along line 3—3 of Fig. 1, wherein the tubular member 9 is shown partly broken away for clearer illustration.

Figures 4 and 5 are partially sectional views of fragments of the apparatus of Figures 1 to 3.

This meter is composed of two pole pieces 2, positioned on a base 1. Each pole piece 2 is formed with reduced ends 3 and 5 and wound with coil 6. The portion 5 is fitted into and supported by the yoke 4 which forms, together with plate 7, cover 8 and base 1, an enclosure for the electro-magnet. 7 and 2 form the poles of the magnet, whose magnetic circuit is composed of poles 2, yoke 4, cover 8, base 1 and plate 7. Each pole piece 3 which fits into the cylindrical opening 7a is spaced from 7 to form an air gap, which completes the magnetic circuit. The armature 9 preferably is composed of a light "Bakelite" or similar tube, wound on each end with an armature coil 10, so positioned that when the armature 9 is in neutral position the coil 10 is in the air gap between poles 2 and 7. The armature 9 does not rotate but is mounted for lateral movement. To accomplish this, there are fixed on the ends of the armature, two flexible flanges 12. These flanges are of conventional design, similar to those employed in loud speakers. They are composed of a main flange portion 12 and a stamped-out web construction 11. These flanges or diaphragms are connected to the armature 9 by some convenient means, such as cementing. The armature is held by the flanges in the proper position so that the ends of the armature are held in axial alignment with the axis of the pole pieces with the coil 10 in the air space. The flanges 12 are secured to the frame by spacers 14 and held in place by nuts 15 on the spacer bars 16a, 16b, 16c and 16d.

These spacer bars are all alike. They are connected to and form a framework between poles 7. On the top of the armature 9 are mounted two guides 17, under and through which the tape 22 is to pass. The tape, which may be a conventional paper tape provided with the proper margin holes for use with drive sprockets, is wound on a roll 19, carried upon spindle 18, supported by arm 20, connected to the side of the instrument. The tape passes under a yieldably mounted idler 21 and over the armature 9, where it is guided by the guides 17, and then passes under the sprocket wheel 23 against which it is held by the resiliently pressed rollers 24. A stylus 30', such as a pen, is mounted in holder 31 connected to link 32, which is in turn pivotally mounted on the spacer bar 16a.

The idler roller 21 is carried on arm 25 by yoke 26. 25 is mounted on pivot 25a (see Fig. 5), which is mounted on spacer bar 16b. Between spacer bar 16b and arm 25 are provided rubber washers 27 which, with arm 25 in its normal position, are under some compression. The driving mechanism is composed of a motor 22a, preferably of the constant speed type, geared to sprocket 23 under which the tape 22 is passed. The tape is held against the sprocket wheel by rollers 24, which are mounted on rod 28a, pivotally supported at 28 on base 1 and resiliently held by a spring 29 and link 30, which is mounted on spacer rod 16d.

The operation of the instrument is as follows:

The current whose characteristics are to be measured may be either of the pulsating unidirectional type or of alternating character, and is impressed on coils 10, which usually are wound in series. Flexible pig-tail connectors for connection of the coils to the current source are not shown, but will be readily understood. The magnetizing coils 6 are connected to a current source which should preferably be constant. As will be readily understood, the variation of the current in the coils 10 in the air gaps between poles 2 and 7 where there is a reasonably high magnetic flux will cause a translation of the armature 9. This translation of the armature will cause a translation of the tape held between guide 17 without permitting an angular displacement of the tape in relation to the top of the armature. This motion of the tape under the marker 30' will define a line whose deflection will be proportional and in phase with the variation in the currents in 10. At the same time the tape is moved longitudinally by driving sprocket 23.

It is to be understood that the foregoing description of my invention is merely illustrative and is not to be taken as limiting of the invention and many changes and modifications may be made within the scope of the appended claims.

I claim:

1. An instrument for recording variations in current in an electrical circuit, comprising, in combination, a frame, a pair of electromagnets mounted thereon, an armature light in weight, flexible means secured to the frame and armature for mounting said armature for limited lateral movement between the electromagnets, said armature having two coils thereon, one coil being located in the air gap of each of said electromagnets, a tape, guides fixed on said armature for guiding said tape and causing lateral movement of the tape with said armature, means for moving the tape longitudinally over the armature through said guides and a stylus rotatably mounted on said frame in such a manner as to be movable in a plane perpendicular to the tape only, the arrangement being such that as the current to be measured is applied to said coils, variations in the current are recorded on said tape.

2. An instrument for recording variations in current in an electrical circuit, comprising, in combination, a frame, a magnet fixed to the frame, an armature having a coil thereon, flexible means for mounting the armature on said frame for limited lateral movement toward or away from said magnet with said coil being located within the magnetic field of said magnet, a tape, guides on said armature for guiding said tape and imparting to the tape the lateral movement of the armature, means for moving the tape longitudinally across said armature through said guides, and a stylus mounted on said frame to contact said tape, said stylus being held against lateral movement with said armature and also held against longitudinal movement with said tape, the arrangement being such that as the current to be measured is applied to said coil, variations in the current are recorded on said tape.

JOHN JAY JAKOSKY.